3,347,909
METABOLIC PRODUCT ISOLATED FROM
CULTURES OF *ASPERGILLUS WENTII*
David Lowe, Geoffrey Lightfoot Floyd Norris, and William Brian Turner, Welwyn, England, assignors to Imperial Chemical Industries Limited, London, England, a corporation of Great Britain
No Drawing. Filed Dec. 2, 1963, Ser. No. 327,495
Claims priority, application Great Britain, Dec. 12, 1962, 47,001/62
3 Claims. (Cl. 260—514)

This invention relates to a new composition of matter and more particularly it relates to a metabolic product, isolated from cultures of a fungus *Aspergillus wentii*, which possesses growth-regulating properties when applied to plants.

According to the invention we provide a new metabolic product, which we propose to name MM27 and which has the molecular formula $C_6H_{10}N_2O_4$ and salts and esters thereof.

The said metabolic product MM27 exists in two crystalline modifications, both in the form of colorless, fibrous needles decomposing above 150° C. without melting and distinguished by their infrared spectra determined on Nujol mulls. Form (a) shows bands at 3530, 3350, 3140(sh), 3050(br), 2700–2500 (series of bands), 2040(w,br), 1675, 1620(br), 1570, 1525(m), 1446(m), 1397(s), 1316(s), 1305(s), 1240(w), 1193(w), 1117(w), 1071(m), 1029(w), 1020(sh), 988(m), 925(w), 876(w), 842(m), 804(m), 792(s) and 760(w). Elementary analysis for carbon, hydrogen and nitrogen shows C, 41.2, 41.7, 41.1, 41.6; H, 6.1, 5.9, 6.0, 5.95; N, 15.2, 15.7%; $C_6H_{10}N_2O_4$ requires C, 41.4; H, 5.8; N, 16.1%. Form (b) shows bands at 3500(w,br), 3100–2450, 2000(w,br), 1625(br), 1550(br), 1305(s), 1060(w), 1025(w), 920(w), 830, 805(m) and 787(m). Elementary analysis for carbon, hydrogen and nitrogen shows C, 40.9, 41.3, 41.2; H, 6.3, 5.8, 5.9; N, 15.7%; $C_6H_{10}N_2O_4$ requires C, 41.4; H, 5.8; N, 16.1%. A study of the X-ray photographs of the two forms (a) and (b) shows that each form contains two closely related components, one of which predominates in form (a) while the other predominates in form (b). The crystal data are as follows:

|  | Form (a) | Form (b) |
|---|---|---|
| Symmetry | Monoclinic | Monoclinic. |
| Cell dimensions: |  |  |
| a | 5.73±0.05 A | 5.73±0.05 A. |
| b | 11.95±0.10 A | 22.59±0.20 A. |
| c | 12.63±0.10 A | 12.86±0.10 A. |
| sin β |  |  |
| Volume (U) | 890 A.³ | 1711 A.³ |
| Average density | 1.43±0.05 |  |
| Cell weight (ZM) | 766±40 | 1474±80. |

The crystals do not yield good X-ray photographs and thus the space groups cannot be determined and in each case the number of molecules in the unit cell (Z) may be 2, 4 or 8. The molecular weights are therefore as follows:

|  | Number of molecules in unit cell (Z) | | |
|---|---|---|---|
|  | 2 | 4 | 8 |
| Form (a) | 383±20 | 191±10 |  |
| Form (b) | 737±40 | 368±20 | 184±10 |

$C_6H_{10}N_2O_4$ requires a molecular weight of 174.

The product MM27 is an amphoteric compound and it can be extracted from a culture filtrate containing it by means of cationic or anionic resins. Paper chromatography of MM27 on Whatman No. 3 paper at 20° C. in the system, n-butanol/acetic acid/water (100:22:50), gives a spot of RF 0.45–0.50, detachable by ninhydrin (yellow fluorescence), or by ferric chloride (orange-brown coloration), or by silver chloride-sodium hydroxide (grey coloration) or by periodate-Schiff's reagent (faint pink coloration). The product MM27 gives negative results when tested according to the Sakaguchi and biuret reactions. Its infrared spectrum, as described above, indicates the presence of the groups, COO—, $+NH_3$ or $>+NH_2$, and OH. Complete hydrolysis of MM27 with boiling mineral acid yields glutaric acid (1 mole-equivalent), carbon dioxide (1 mole-equivalent) and ammonia (2 mole-equivalents). Hydrolysis of MM27 with boiling water yields (i) a major component, M.P. 101–103° C. and molecular formula $C_6H_9NO_5$ containing a carboxylic acid group and a hydroxyl group, the said component forming a methyl ester, M.P. 57–59° C. or 64–65° C. of molecular formula $C_7H_{11}NO_5$, (ii) a minor component, M.P. 102–103° C. and molecular formula $C_6H_7NO_4$ containing no hydroxyl group, and (iii) ammonia (1 mole-equivalent).

From the above knowledge of physical and chemical properties, we believe that MM27 may have the structural formula:

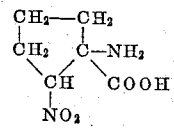

which is that of 1-amino-2-nitrocyclopentane carboxylic acid.

According to a further feature of the invention we provide a process for the manufacture of the product MM27 which comprises cultivation of an active strain of the organism *Aspergillus wentii* in a nutrient medium containing an assimilable source of carbon and an assimilable source of nitrogen followed by isolation of the product from the medium.

The fermentation process may be carried out by means of surface culture or it may be carried out in a stirred aerated medium under batchwise or continuous conditions. Suitable active strains of the organism *Aspergillus wentii* which may be used to produce MM27 are those originating from the Commonwealth Mycological Institute located at Kew, England and identified as CMI 39510, CMI 49129, CMI 16033, CMI 17295, CMI 23013, CMI 31256 and CMI 35035 and of these, a particularly valuable strain is CMI 49129. The fermentation is generally carried out at a temperature of about 18–

38° C. and preferably at a temperature of about 20–25° C. Growth of the organism is allowed to continue for a period of about 4–6 days under stirred aerated culture conditions or for a period of about 14–21 days under surface culture conditions before the product MM27 is isolated from the culture medium.

Suitable assimilable sources of carbon may be for example a polyhydric alcohol for example sucrose, glucose or glycerol, a source of polymerized carbohydrate for example starch, or naturally-occurring or synthetic oils and fats. The carbon source is generally present in the medium within the range of about 0.1–30% by weight and preferably within the range of about 5–15% by weight. Suitable assimilable sources of nitrogen may be an inorganic source or an organic source. It may be conveniently provided initially in the form of for example a nitrate of an alkali metal or an alkaline earth metal or an ammonium salt of an inorganic acid or an organic acid for example sodium, potassium, calcium or ammonium nitrate or ammonium tartrate, ammonium sulphate or ammonium phosphate. It may also be an aminoacid for example glycine, a seed meal for example cottonseed meal, or corn steep liquor, peptone, urea, yeast extract or meat extracts. The nitrogen source is generally present in the medium in an amount such that there is present between about 0.001% and about 1.0% and preferably between 0.01% and 0.50% of elementary nitrogen in the medium. The medium usually contains smaller quantities of essential elements such as phosphorus (potassium dihydrogen phosphate), magnesium (magnesium sulphate), sulphur (a sulphate) and (potassium chloride) and minute quantities of so-called trace elements such as iron, manganese, zinc, molybdenum and copper.

As suitable nutrient media there may be mentioned for example (i) a medium containing 5% glucose, 0.2% sodium nitrate and 0.1% of yeast extract ("Difco" brand), (ii) a medium containing 5% glucose, 0.27% ammonium tartrate, 0.017% ammonium sulphate, 0.04% diammonium hydrogen phosphate and 0.1% of yeast extract ("Difco" brand) or (iii) a medium containing 5% glucose and 0.095% ammonium nitrate, containing essential elements such as phosphorus (potassium dihydrogen phosphate), magnesium (magnesium sulphate), sulphur (a sulphate) and potassium (potassium chloride) and trace elements such as iron, manganese, zinc, molybdenum and copper. The 5% by weight of glucose in these nutrient media may be replaced by 12% by weight of sucrose as the carbon assimilable source.

The product MM27, which collects in the nutrient medium during the growth of the organism, is an amphoteric compound and it may be isolated from the culture filtrate by adsorption on to a cationic resin or on to an anionic resin. It is preferably isolated by adsorption on to a cationic resin for example Amberlite IR-120 sulphonic acid resin (H+) from which it can be removed by elution with a dilute aqueous alkali such as 2 N ammonium hydroxide. It may alternatively be adsorbed on to an anionic resin for example Amberlite IRA-400 (OH) from which it can then be removed by elution.

As stated above, the product MM27 possesses growth regulating properties when applied to plants. A culture filtrate containing the product, or a solution of the pure crystalline product in water, causes dwarfing of pea plants if applied as a foliage spray at the rate of 10–100 p.p.m. The product MM27 also causes dwarfing in pea plants if applied in the form of a solution in ethanol, as microdrops (2 μl.) to plants at a dosage rate of 10–100 μg./plant, or if injected into the stem of the plant by means of a fine capillary at a dosage rate of 1–10 μg./plant.

Thus according to a further feature of the invention we provide plant growth regulating compositions comprising the product MM27, or a salt or an ester thereof, in admixture with a diluent or carrier therefor.

The said diluent or carrier may be for example an aqueous or organic solvent medium or it may be an inert solid for example chalk, talc or kaolin clay.

The invention is illustrated but not limited by the following example:

EXAMPLE 1 liter of nutrient medium is made up as follows:

| | | |
|---|---|---|
| Sucrose | gm | 120 |
| Ammonium tartrate | gm | 3.0 |
| Potassium dihydrogen phosphate | gm | 1.0 |
| Magnesium sulphate heptahydrate | gm | 0.5 |
| Potassium chloride | gm | 0.5 |
| Minor element solution | ml | 1 |
| Water to make up to 1 liter. | | |

The minor element solution is made up as follows:

| | | |
|---|---|---|
| Ferrous sulphate heptahydrate | gm | 0.1 |
| Copper sulphate pentahydrate | gm | 0.015 |
| Zinc sulphate heptahydrate | gm | 0.1 |
| Manganese sulphate tetrahydrate | gm | 0.01 |
| Potassium molybdate | gm | 0.01 |
| Water to make up to | ml | 100 |

Sufficient mineral acid is added to give a clear solution.

This nutrient medium had a pH of 5.5 before being autoclaved. The medium (5 l.) was inoculated with the organism *Aspergillus wentii* (CMI 49129) in a fermenter maintained at a temperature of 25° C. with stirring at 425 r.p.m. and with an airflow of ½ volume/volume/minute. After 95 hours growth under these conditions, the vegetative inoculum was added to a further 75 l. of the nutrient medium (containing constituents for 80 l. of medium). Cultivation was again carried out at a temperature of 25° C. with stirring at 425 r.p.m. and with an airflow of ½ volume/volume/minute and after 96 hours, the medium was harvested. The broth was filtered free from mycelium and the resulting culture filtrate (65. l.) was further clarified with Dicalite (a diatomaceous earth) and was then passed down a column of Amberlite IR–120 sulphonic acid resin (800 ml.) and the eluate was discarded. The column was washed with distilled water and was then eluted with 2 N aqueous ammonium hydroxide (3.5 l.). The eluate was concentrated in vacuo, at a temperature below 40° C., to about 200 ml. and this solution was stirred with charcoal (10 gm.) and the mixture filtered. The filtrate was then passed down a column of Amberlite IRC–50 carboxylic acid resin (100 ml.) and the eluate was further concentrated in vacuo, at a temperature below 40° C., to a small volume. There is thus obtained, in a crystalline form, the desired product MM27 which when recrystallized rapidly from hot water, is obtained in the form of colorless, fibrous needles which darken without melting at temperatures above 150° C. The compound has the physical and chemical properties described earlier in the specification.

What we claim is:

1. A compound selected from the group consisting of: a metabolic product having the molecular formula $$C_6H_{10}N_2O_4$$

and the salts and esters thereof, said product having the form of colorless crystals which decompose above 150° C. without melting and which are characterized by one or the other of two crystalline forms present in predominant amount and represented by the following infrared spectra as determined on Nujol mulls:

Form (a) with bands at 3530, 3350, 3140(sh), 3050(br), 2700–2500 (series of bands), 2040(w, br), 1675, 1620(br), 1570, 1525(m), 1446(m), 1397(s), 1316(s), 1305(s), 1240(w), 1193(w), 1117(w), 1071(m), 1029(w), 1020(sh), 988(m), 925(w), 876(w), 842(m), 804(m), 792(s) and 760(w), Form (b) with bands at 3500(w, br), 3100–2450, 2000(w, br), 1625(br), 1550(br), 1305(s), 1060(w), 1025(w), 920(w), 830, 805(m) and 787(m), said product being further identified by (a) the following crystal data:

|  | Form (a) | Form (b) |
|---|---|---|
| Symmetry | Monoclinic | Monoclinic. |
| Cell dimensions: | | |
| a | 5.73±0.05 A. | 5.73±0.05 A. |
| b | 11.95±0.10 A. | 22.59±0.20 A. |
| c | 12.63±0.10 A. | 12.86±0.10 A. |
| sin β | | |
| Volume (U) | 890 A.$^3$ | 1711 A.$^3$ |
| Average density | 1.43±0.05 | |
| Cell weight (ZM) | 766±40 | 1474±80. | and (b) yielding on complete hydrolysis with mineral acid glutaric acid, carbon dioxide and ammonia.

2. A product according to claim 1 which is predominantly in the crystalline Form (a).

3. A product according to claim 1 which is predominantly in the crystalline Form (b).

References Cited

UNITED STATES PATENTS 2,560,584  7/1951  MacDonald _____ 260—514 X

OTHER REFERENCES

Burrows et al. "Chem. Comm." (London), No. 5, 1965, pp. 75–76.

RICHARD K. JACKSON, *Primary Examiner.*